(12) United States Patent
Huth et al.

(10) Patent No.: US 8,814,527 B2
(45) Date of Patent: *Aug. 26, 2014

(54) TITANIUM SHEATH AND AIRFOIL ASSEMBLY

(75) Inventors: Brian P. Huth, Westfield, MA (US); Paul A. Carvalho, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1296 days.

This patent is subject to a terminal disclaimer.

(21) Appl. No.: 12/537,592

(22) Filed: Aug. 7, 2009

(65) Prior Publication Data

US 2011/0033308 A1    Feb. 10, 2011

(51) Int. Cl.
| B64C 11/20 | (2006.01) |
| F01D 5/14 | (2006.01) |
| F04D 29/02 | (2006.01) |
| F04D 29/32 | (2006.01) |

(52) U.S. Cl.
CPC ......... *B64C 11/205* (2013.01); *F05D 2300/133* (2013.01); *F04D 29/023* (2013.01); *F04D 29/325* (2013.01); *F01D 5/147* (2013.01)
USPC .................... 416/224; 416/229 R; 416/241 R

(58) Field of Classification Search
USPC ......... 416/224, 229 R, 241 R, 61; 244/134 R, 244/134 A, 134 D
See application file for complete search history.

(56) References Cited

U.S. PATENT DOCUMENTS

| 2,615,236 | A | * | 10/1952 | Stulen et al. ............... 29/889.72 |
| 2,648,388 | A | * | 8/1953 | Haines et al. .................. 416/95 |
| 3,166,295 | A | * | 1/1965 | Szewalski et al. ............ 416/179 |
| 4,010,530 | A |   | 3/1977 | Delgrosso et al. |
| 4,111,600 | A |   | 9/1978 | Rothman et al. |
| 4,314,892 | A | * | 2/1982 | Stevens ........................... 205/50 |
| 4,441,857 | A |   | 4/1984 | Jackson et al. |
| 4,687,159 | A | * | 8/1987 | Kageorge .................. 244/134 A |
| 4,738,594 | A | * | 4/1988 | Sato et al. ...................... 416/224 |
| 4,895,491 | A | * | 1/1990 | Cross et al. .................... 416/224 |
| 4,950,375 | A |   | 8/1990 | Leger |
| 5,141,400 | A | * | 8/1992 | Murphy et al. ........... 416/204 A |
| 5,210,946 | A | * | 5/1993 | Monroe ..................... 29/889.71 |
| 5,306,120 | A |   | 4/1994 | Hammer et al. |
| 5,356,096 | A | * | 10/1994 | Rauckhorst et al. ...... 244/134 A |

(Continued)

FOREIGN PATENT DOCUMENTS

| GB | 1130285 | 10/1968 |
| GB | 2324834 | 11/1998 |

OTHER PUBLICATIONS

EP Search Report for European Patent Application No. 10251261.3-1754 completed Mar. 8, 2013.

*Primary Examiner* — Edward Look
*Assistant Examiner* — Christopher R Legendre
(74) *Attorney, Agent, or Firm* — Carlson, Gaskey & Olds, P.C.

(57) ABSTRACT

An airfoil assembly includes an airfoil body extending between a leading edge, a trailing edge, a suction side, and a pressure side. A first sheath having an outer side and an inner side forms a cavity for receiving at least a portion of the airfoil body and is bonded on the inner side to the leading edge of the airfoil body. The first sheath is formed of a titanium-based metallic material. A second sheath is bonded to the outer side of the first sheath.

18 Claims, 2 Drawing Sheets

(56) References Cited

U.S. PATENT DOCUMENTS

| | | | |
|---|---|---|---|
| 5,528,828 A | 6/1996 | Leahy et al. | |
| 5,674,370 A * | 10/1997 | DuPree | 205/67 |
| 5,782,607 A | 7/1998 | Smith et al. | |
| 5,881,972 A * | 3/1999 | Smith et al. | 244/121 |
| 5,908,285 A | 6/1999 | Graff | |
| 5,908,522 A * | 6/1999 | Lofstrom et al. | 156/94 |
| 6,037,004 A | 3/2000 | Zajchowski et al. | |
| 6,279,856 B1 * | 8/2001 | Rutherford et al. | 244/134 E |
| 6,607,358 B2 * | 8/2003 | Finn et al. | 416/224 |
| 7,334,997 B2 * | 2/2008 | Karafillis | 416/224 |
| 7,980,817 B2 * | 7/2011 | Foose et al. | 415/191 |
| 8,088,498 B2 * | 1/2012 | Smith et al. | 428/678 |
| 8,449,784 B2 * | 5/2013 | Parkos et al. | 216/34 |
| 2003/0129061 A1 | 7/2003 | Finn | |
| 2008/0265095 A1 * | 10/2008 | Lee et al. | 244/129.1 |
| 2009/0148301 A1 | 6/2009 | Leahy et al. | |
| 2011/0033308 A1 * | 2/2011 | Huth et al. | 416/229 R |
| 2011/0116906 A1 * | 5/2011 | Smith et al. | 415/1 |
| 2011/0194941 A1 * | 8/2011 | Parkin et al. | 416/224 |
| 2012/0301292 A1 * | 11/2012 | Deal et al. | 415/220 |
| 2013/0004322 A1 * | 1/2013 | Schwarz et al. | 416/224 |
| 2013/0236323 A1 * | 9/2013 | Mironets et al. | 416/229 R |

* cited by examiner

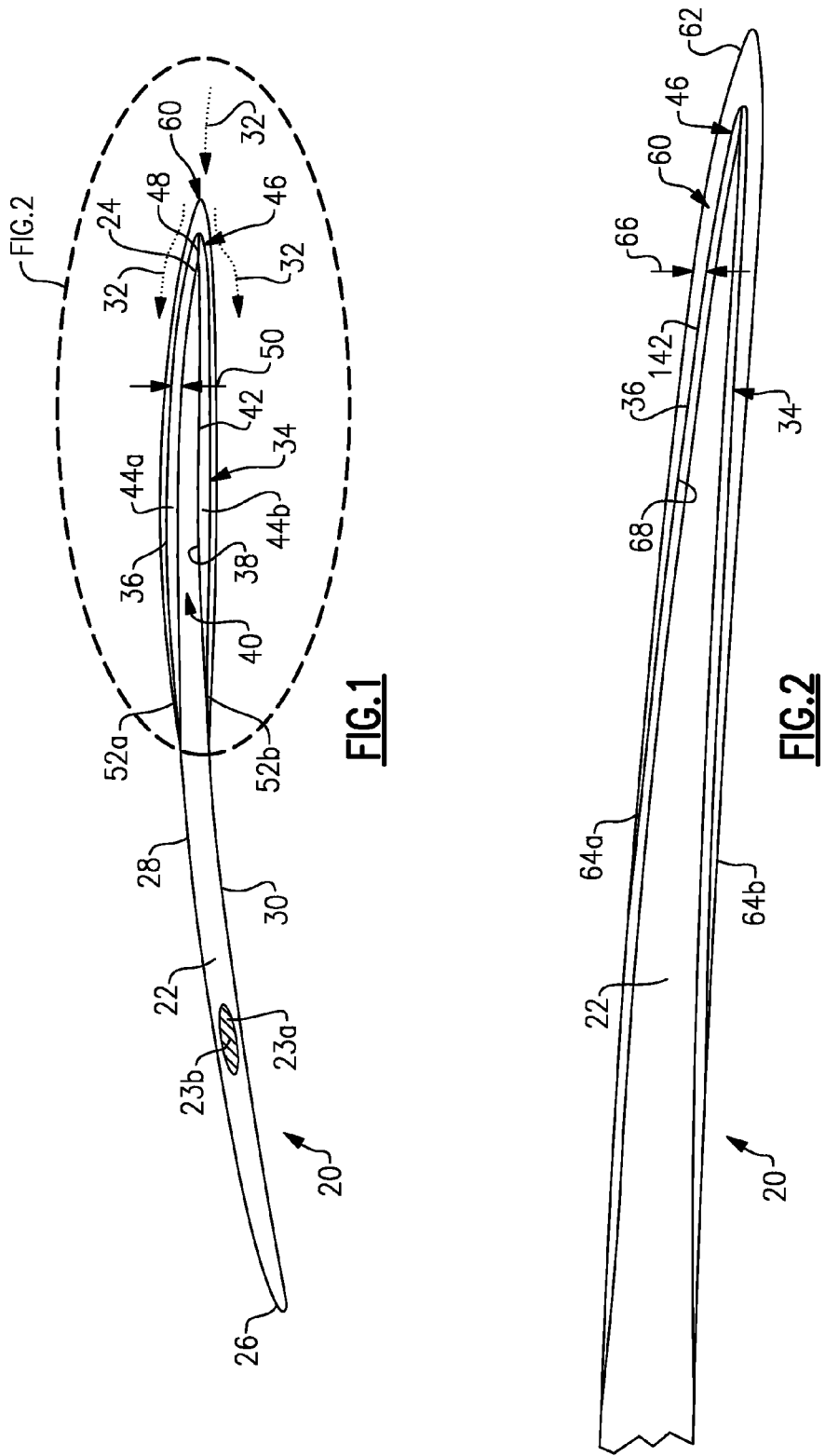

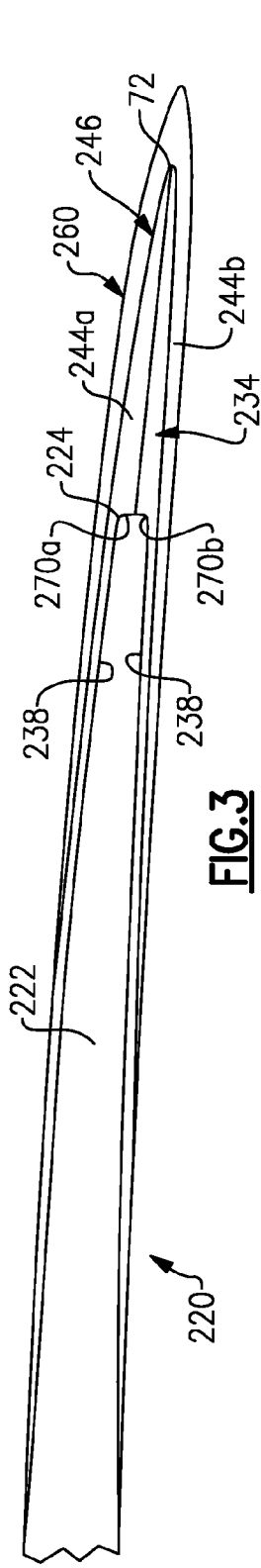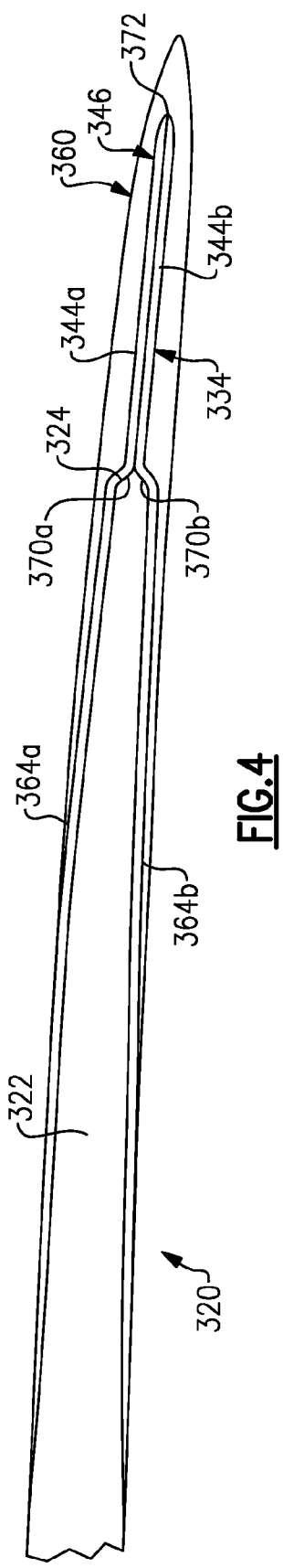

US 8,814,527 B2

TITANIUM SHEATH AND AIRFOIL ASSEMBLY

BACKGROUND OF THE INVENTION

This disclosure relates to airfoils, such as those used for blades or propellers, that utilize protective sheaths to reduce damage from impact of objects striking the airfoils.

Airfoils are typically designed to meet desired requirements for the impact of foreign objects. For instance, propeller and fan blades may be designed to meet regulations for a bird strike.

The design requirements may be especially challenging for airfoils constructed of composite materials that may be less ductile than airfoils formed of metallic alloys. In some cases, the airfoils may include a nickel sheath for better resistance to erosion. However, this material is relatively brittle and does not absorb much energy in a foreign object impact. Additionally, known sheaths are difficult or expensive to manufacture with the desired coverage and properties for airfoil designs that have a relatively wide chord length.

SUMMARY OF THE INVENTION

An exemplary airfoil assembly includes an airfoil body extending between a leading edge, a trailing edge, a suction side, and a pressure side. A first sheath having an outer side and an inner side that forms a cavity for receiving at least a portion of the airfoil body is bonded on the inner side to the leading edge of the airfoil body. The first sheath is formed form a titanium-based metallic material. The example sheath may be provided as a separate component that is then attached to the airfoil body. A second sheath is bonded to the outer side of the first sheath.

An exemplary method for protecting an airfoil assembly includes providing an airfoil body that extends between a leading edge, a trailing edge, a suction side, and a pressure side with a first sheath and a second sheath that is bonded to an outer side of the first sheath, the first sheath having an outer side and an inner side that forms a cavity for receiving at least a portion of the airfoil body. The inner side is bonded to the leading edge of the airfoil and the first sheath is formed from a titanium-based metallic material.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 1 illustrates an example airfoil assembly.
FIG. 2 illustrates a portion of the airfoil assembly of FIG. 1.
FIG. 3 illustrates another example airfoil assembly having a different nose shape.
FIG. 4 illustrates another example airfoil assembly having another nose shape.

DETAILED DESCRIPTION OF THE PREFERRED EMBODIMENT

FIGS. 1 and 2 illustrate selected portions of an example airfoil assembly 20, which is shown in cross-section and may be used as a fan blade, propeller, or other similar arrangement that utilizes airfoil shaped blades or vanes. In this case, the airfoil assembly 20 includes an airfoil body 22 that extends between a leading edge 24, a trailing edge 26, a suction side 28, and a pressure side 30. In general, the leading edge 24, the trailing edge 26, the suction side 28, and the pressure side 30 are made with reference to an intended air flow 32 over the airfoil assembly 20.

The airfoil assembly 20 includes a sheath 34, which may also be referred to as a first sheath, which is bonded to the leading edge 24 of the airfoil body 22 for protecting the underlying airfoil body 22 from foreign body impact, such as debris within the air flow 32 or a bird strike. As an example, the airfoil body 22 may be formed of a composite material (as illustrated in the cutaway section) that may be less resistant to impact than metallic airfoils. The composite may include a polymer matrix 23a and reinforcement fibers 23b distributed through the matrix. The polymer matrix 23a and reinforcement fibers 23b may be any suitable types of materials for the intended end use, such as epoxy polymer and graphite fibers.

In the illustrated example, the sheath 34 includes an outer side 36 and an inner side 38 that forms a cavity 40 for receiving at least a portion of the airfoil body 22. The inner side 38 is bonded to at least the leading edge 24 of the airfoil body 22, and in the illustrated example, also portions of the suction side 28 and pressure side 30.

The sheath 34 is formed from a titanium-based metallic material. The titanium material may be relatively pure titanium or a titanium alloy. The titanium-based metallic material is relatively ductile and serves to absorb energy from the impact of any foreign objects on the airfoil assembly 20. An adhesive 42 bonds the inner side 38 of the sheath 34 and the airfoil body 22 together. For instance, the adhesive may be a polymer adhesive, such as epoxy.

The sheath 34 may include a first plate 44a bonded on the suction side 28 of the airfoil body 22 and a second plate 44b bonded on the pressure side 30. Initially, the first and second plates 44a and 44b may be separate and distinct pieces that are then assembled onto the airfoil body 22 using the adhesive 42. In this case, the first and second plates 44a and 44b meet at a nose 46 of the sheath 34 and form a seam 48 where the first plate 44a is bonded directly to the second plate 44b. The adhesive 42 may also be used to bond the first and second plates 44a and 44b together at the seam 48. Alternatively, the first and second plates 44a and 44b may be metallurgically bonded at the seam 48, such as through diffusion bonding or welding in a known manner.

In the illustrated example, each of the first and second plates 44a and 44b include a wall thickness 50 that tapers from the nose 46 to rearward ends 52a and 52b of the respective first and second plates 44a and 44b. The taper of the sheath 34 facilitates energy transfer between the sheath 34 and the airfoil body 22.

The airfoil assembly 20 additionally includes another sheath 60, a second sheath, which is bonded to the outer side 36 of the first sheath 34. The sheath 60 may be formed of a nickel-based metallic material and further facilitates protecting the underlying airfoil body 22. For instance, the first sheath 34 that is formed from the titanium-based metallic material provides ductility that absorbs energy from an impact on the airfoil assembly 120 and the outer sheath 60, which is not as ductile as the material of the sheath 34, provides a relatively high hardness that protects from erosion. Given this description, one of ordinary skill in the art will recognize other types of materials for use as the sheath 60 to meet their particular needs.

The sheath 60 includes a nose 62 and rearward ends 64a and 64b. In this case, a wall thickness 66 of the sheath 60 tapers between the nose 62 and the rearward ends 64a and 64b in order to facilitate aerodynamics of the airfoil assembly 20 and transfer of energy between the sheath 60, the sheath 34, and the airfoil body 22.

The sheath 60 may be formed using any suitable process, such as electroforming, and then assembled onto the airfoil assembly 20. For instance, the sheath 60 may be pre-fabricated as a separate and distinct piece and then bonded to the outer side 36 of the sheath 34. In this regard, the airfoil assembly 20 may include another adhesive 142 between an inner surface 68 of the sheath 60 and the outer side 36 of the sheath 34. In some examples, the adhesive 142 may be a polymeric adhesive, such as epoxy. In this disclosure, like reference numerals designate like elements where appropriate, and reference numerals with the addition of one-hundred or multiples thereof designate modified elements that are understood to incorporate the same features and benefits of the corresponding original elements.

In the illustrated example, the airfoil body 22 may be considered to be a wide chord length airfoil that may be associated with a relatively large component, such as a propeller or fan blade of a gas turbine engine. In this regard, the sheath 34 may be designed to cover a relatively large surface area of the suction side 28 and the pressure side 30. For instance, the coverage may be represented in terms of an amount of area that is covered by the sheath 34 in comparison to an amount of area that is not covered by the sheath 34. In one example, the ratio of the surface area covered to the surface area not covered may be about 0.1-1. In other examples, the coverage may be represented by a length of the sheath 34 in comparison to a chord length of the airfoil body 22.

FIG. 3 illustrates another embodiment airfoil assembly 220 that is modified relative to the previous example. In this example, the leading edge 224 of the airfoil body 222 is more bluntly shaped than in the previous examples. The sheath 234 is likewise formed to fit intimately over the leading edge 224 and the first and second plates 244a and 244b thereby include respective notches 270a and 270b on the inner side 238. In this case, each of the notches 270a and 270b abut against the leading edge 224 of the airfoil body 222.

The nose 246 of the sheath 234 is somewhat elongated in comparison to the nose 46 of the prior examples. In this case, the nose 246 extends forward relative to the notches 270a and 270b and terminates at a tip 72. Each of the first and second plates 244a and 244b tapers between the respective notches 270a and 270b and the tip 72. That is, each plate 244a and 244b becomes progressively thinner toward the tip 72. The exemplary shape facilitates absorbing energy from an impact on the leading edge 224 of the airfoil assembly 220. For instance, the elongated nose 246 provides additional titanium-based metallic material for absorbing more energy of the impact.

FIG. 4 illustrates another example airfoil assembly 320 that also includes somewhat of a blunt leading edge 324. However, in this case, the walls of the first plate 344a and the second plate 344b, are relatively uniform between the respective notches 370a and 370b and the tip 372 of the nose 346. The walls of the sheath 360, however, are thicker in the area of the nose 346 but taper toward the rearward end 364a and 364b. In this design, the relatively thicker portions of the sheath 360 in comparison to the prior examples provide additional erosion resistance while the nose 346 of the sheath 334 provides ductility for absorbing the energy of a foreign object impact.

As may be appreciated, utilizing separate and distinct plates in the illustrated examples to form the respective sheaths 34, 234, and 334 facilitates providing a low cost assembly that is relatively easy to construct. For instance, the plates may be individually manufactured to the designed shape and then simply assembled on to the airfoil body. In contrast, forming the sheaths from a single, monolithic piece of titanium material may be difficult to manufacture and would significantly increase the cost of the airfoil assembly.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil assembly comprising:
an airfoil body extending between a leading edge, a trailing edge, a suction side, and a pressure side;
a first sheath including a first plate on the suction side of the airfoil body and a second plate on the pressure side of the airfoil body that meet at a seam at a nose near the leading edge, the first sheath having an outer side and an inner side that forms a cavity for receiving at least a portion of the airfoil body, the inner side being bonded to the leading edge of the airfoil body, and the first sheath being formed from a titanium-based metallic material; and
a second sheath bonded to the outer side of the first sheath.

2. The airfoil assembly as recited in claim 1, wherein a wall thickness of the first sheath tapers from a nose at the leading edge of the airfoil body to a rearward end of the first sheath.

3. The airfoil assembly as recited in claim 1, wherein the second sheath is formed of a nickel-based metallic material.

4. The airfoil assembly as recited in claim 1, further comprising an adhesive between the first sheath and the airfoil body.

5. The airfoil assembly as recited in claim 1, wherein the airfoil body is a composite material comprising a polymer matrix and reinforcement fibers distributed within the polymer matrix.

6. The airfoil assembly as recited in claim 1, wherein the airfoil body includes surface portions that are covered by the first sheath and other surface portions that are not covered by the first sheath, with a ratio of the covered portion to the uncovered portion that is about 0.1-1.

7. The airfoil assembly as recited in claim 1, wherein the inner side of the first sheath is in direct contact with the airfoil body, and the second sheath is adhesively bonded directly to the outer side of the first sheath.

8. The airfoil assembly as recited in claim 1, wherein the second sheath is seam-free.

9. The airfoil assembly as recited in claim 1, wherein the second sheath has a free outer surface.

10. The airfoil assembly as recited in claim 1, wherein the second sheath has a free outer surface at a nose.

11. The airfoil assembly as recited in claim 1, wherein the second sheath is formed of a nickel-based metallic material, the first sheath providing ductility that absorbs energy from an impact and the second sheath providing a lower ductility and a higher hardness for erosion.

12. An airfoil assembly comprising:
an airfoil body extending between a leading edge, a trailing edge, a suction side, and a pressure side;
a first sheath having an outer side and an inner side that forms a cavity for receiving at least a portion of the airfoil body, the inner side being bonded to the leading edge of the airfoil body, the first sheath being formed from a titanium-based metallic material, the first sheath including a first plate on the suction side of the airfoil body and a second plate on the pressure side of the airfoil body that meet at a nose near the leading edge, wherein the first plate and the second plate include respective notches that abut against the leading edge of the airfoil body, the first plate and the second plate each having a uniform wall thickness from the respective notches to a tip of the nose, and wherein the nose of the first sheath extends forward relative to the leading edge of the airfoil body and includes a seam where the first plate and the second plate meet; and
a second sheath bonded to the outer side of the first sheath.

13. A sheath for an airfoil assembly, comprising:
a first sheath body including a first plate and a second plate that meet at a seam at a nose, the first sheath body having an outer side and an inner side that forms a cavity for receiving at least a portion of an airfoil body, the first sheath being formed of a titanium-based metallic material; and
a second, metal sheath body bonded to the outer side of the first sheath body.

14. The sheath as recited in claim 13, wherein a wall thickness of the first sheath tapers from a nose to a rearward end of the first sheath.

15. The sheath as recited in claim 13, wherein the second sheath is formed of a nickel-based metallic material, the first sheath providing ductility that absorbs energy from an impact and the second sheath providing a lower ductility and a higher hardness for erosion.

16. A sheath for an airfoil assembly, comprising:
a first sheath body having an outer side and an inner side that forms a cavity for receiving at least a portion of an airfoil body, the first sheath being formed of a titanium-based metallic material, the first sheath including a first plate and a second plate that meet at a nose, the nose extending forward relative to the cavity and including a seam where the first plate and the second plate meet, and wherein the first plate and the second plate include respective notches within the cavity, the first plate and the second plate each having a uniform wall thickness from the respective notches to a tip of the nose; and
a second sheath body bonded to the outer side of the first sheath body.

17. A method for protecting an airfoil assembly, comprising:
providing an airfoil body that extends between a leading edge, a trailing edge, a suction side, and a pressure side with a first sheath and a second sheath bonded to an outer side of the first sheath, the first sheath including a first plate on the suction side of the airfoil body and a second plate on the pressure side of the airfoil body that meet at a seam at a nose near the leading edge, the first sheath having an inner side that forms a cavity for receiving at least a portion of the airfoil body, the inner side being bonded to the leading edge of the airfoil, and the first sheath being formed of a titanium-based metallic material.

18. The method as recited in claim 17, further comprising selecting the second sheath to be a nickel-based metallic material.

* * * * *